(12) United States Patent
Bevilacqua (10) Patent No.: US 10,556,544 B1
(45) Date of Patent: Feb. 11, 2020

(54) RETRACTABLE SUPPORT (71) Applicant: James Bevilacqua, East Amherst, NY (US)

(72) Inventor: James Bevilacqua, East Amherst, NY (US)

( * ) Notice: Subject to any disclaimer, the term of this patent is extended or adjusted under 35 U.S.C. 154(b) by 0 days.

(21) Appl. No.: 16/109,151

(22) Filed: Aug. 22, 2018

(51) Int. Cl.
*B60R 7/10* (2006.01)
*A47G 25/06* (2006.01)
*B60N 3/02* (2006.01)
*B60R 11/00* (2006.01)

(52) U.S. Cl.
CPC ............ *B60R 7/10* (2013.01); *A47G 25/0685* (2013.01); *B60N 3/026* (2013.01); *B60R 2011/0028* (2013.01)

(58) Field of Classification Search
CPC ..... B60R 7/10; B60R 7/08; B60R 2011/0028; B60R 2011/0036; B60R 2011/0043; B60R 2011/0045; B60R 2011/0084; B60R 2011/0085; A47G 25/0685; A47G 25/10; B60N 3/026
See application file for complete search history.

(56) References Cited

U.S. PATENT DOCUMENTS

| 2,335,030 | A | | 11/1943 | Rotheraine | |
|---|---|---|---|---|---|
| 4,632,255 | A | | 12/1986 | Kennedy | |
| 5,226,569 | A | * | 7/1993 | Watjer | B60R 7/10 211/123 |
| 6,422,524 | B1 | * | 7/2002 | Spagnuolo | B60R 7/10 248/307 |
| 7,988,107 | B2 | * | 8/2011 | Miller | A47L 15/505 248/176.1 |
| 9,016,642 | B1 | * | 4/2015 | Ay | F16B 45/00 248/205.1 |
| 9,695,975 | B2 | * | 7/2017 | Ogawa | F16M 13/022 |
| 2002/0104939 | A1 | * | 8/2002 | Perrault | A63B 27/00 248/218.4 |
| 2003/0141423 | A1 | * | 7/2003 | Gordon | A47G 25/065 248/304 |
| 2005/0161415 | A1 | * | 7/2005 | Iversen | A47F 7/24 211/85.3 |
| 2008/0169667 | A1 | * | 7/2008 | Siniarski | B60N 3/002 296/37.8 |
| 2011/0095156 | A1 | * | 4/2011 | Myers | B60R 7/10 248/341 |

(Continued)

FOREIGN PATENT DOCUMENTS

| CH | 171288 | 11/1934 |
|---|---|---|
| CH | 218031 | 4/1942 |

(Continued)

*Primary Examiner* — Corey N Skurdal
(74) *Attorney, Agent, or Firm* — Simpson & Simpson, PLLC (57) ABSTRACT

A retractable support, including a base, including a first section including a first surface, and a second section connected to the first section, and an arm rotatably and translationally connected to the base, the arm including a third section engaged with the second section, the third section including a second surface, a third surface, and a fourth surface, and a fourth section connected to the third section, wherein, the arm is arranged to translationally displaced relative to the base to lock and unlock the retractable support, and rotationally displace relative to the base to expand and retract the support.

20 Claims, 11 Drawing Sheets

(56) References Cited

U.S. PATENT DOCUMENTS

2014/0332575 A1\* 11/2014 Huelke .................... B60R 7/10
                                                                                        224/553
2017/0217378 A1\* 8/2017 Rodriguez ................ B60R 7/10
2019/0039527 A1\* 2/2019 Herman .................... B60R 7/10

FOREIGN PATENT DOCUMENTS

| | | |
|---|---|---|
| CH | 347619 | 8/1960 |
| DE | 1529395 | 1/1943 |
| DE | 815389 | 7/1949 |
| EP | 0311436 | 4/1989 |
| GB | 2677 | 2/1910 |
| GB | 316768 | 8/1929 |
| GB | 694576 | 7/1953 |
| GB | 887851 | 1/1962 |

\* cited by examiner

RETRACTABLE SUPPORT

FIELD

The present disclosure relates to the field of retractable supports, and more particularly, to retractable supports that lock in the retracted position, and even more particularly, to retractable supports that lock in both the retracted and expanded position.

BACKGROUND

Vehicles are designed primarily to transport passengers and to limit space. Vehicles are usually equipped with a hook on which clothing on hangers can be hung. However, the clothing hooks that come standard with the vehicle limit the number and type of clothes hangers that may be hung thereon. For example, standard plastic hangers are very difficult to arrange on the clothing hook.

Thus, there is a long felt need for a support for a vehicle having an arm that allows for a plurality of clothes hangers of any type to be hung thereon. There is also a long felt need for such a support to be extensible and retractable, and that such a support be capable of locking in both the extended and retracted positions.

SUMMARY

According to aspects illustrated herein, there is provided a retractable support, comprising a base, including a first section including a first surface, and a second section connected to the first section, and an arm rotatably and translationally connected to the base, the arm including a third section engaged with the second section, the third section including a second surface, a third surface, and a fourth surface, and a fourth section connected to the third section, wherein, the arm is arranged to translationally displaced relative to the base to lock and unlock the retractable support, and rotationally displace relative to the base to expand and retract the support.

According to aspects illustrated herein, there is provided a retractable support, comprising a base, including a first section including a first surface, and a second section connected to the first section, and an arm connected to the base, the arm including a third section engaged with the second section, the third section including a second surface, a third surface, and a fourth surface, and a fourth section connected to the third section, wherein in a locked position, the arm is translationally displaceable and rotatably locked with respect to the base, and in an unlocked position, the arm is translationally and rotationally displaceable with respect to the base.

According to aspects illustrated herein, there is provided a retractable support, comprising a base, including a first section including a first surface and a first hole, and a second section connected to the first section, the second section including a first portion arranged proximate the first hole a second portion arranged proximate the first hole and adjacent to the first portion, and a third portion arranged proximate the first hole, opposite the first portion, and adjacent to the second portion, an arm connected to the base, the arm including a third section engaged with the second section, the third section including a second hole, a second surface, a third surface arranged adjacent the second surface, and a fourth surface arranged opposite the second surface and adjacent the third surface, and a fourth section connected to the third section; and a pin connected to the second section and engaged with the second hole, wherein in a locked retracted position, the second surface substantially abuts against the first surface and the third surface substantially abuts against the second portion, and in a locked expanded position, the fifth surface substantially abuts the second surface, the sixth surface substantially abuts the third surface, and the seventh surface substantially abuts the fourth surface.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

Figure 1:
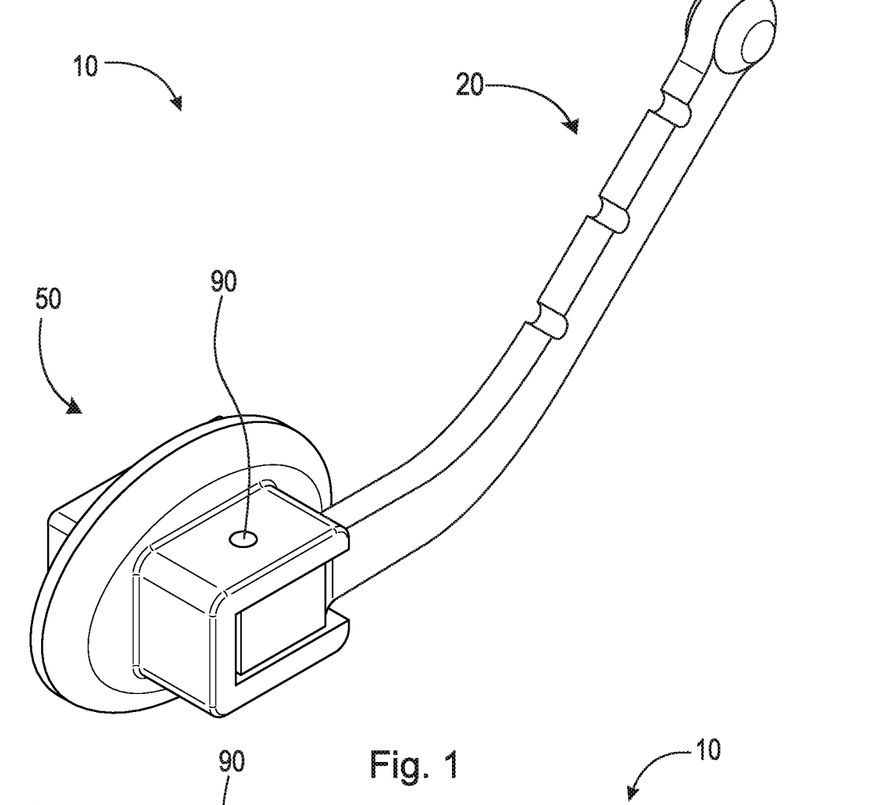
FIG. 1 is a perspective view of a retractable support in a retracted position.
Figure 2:
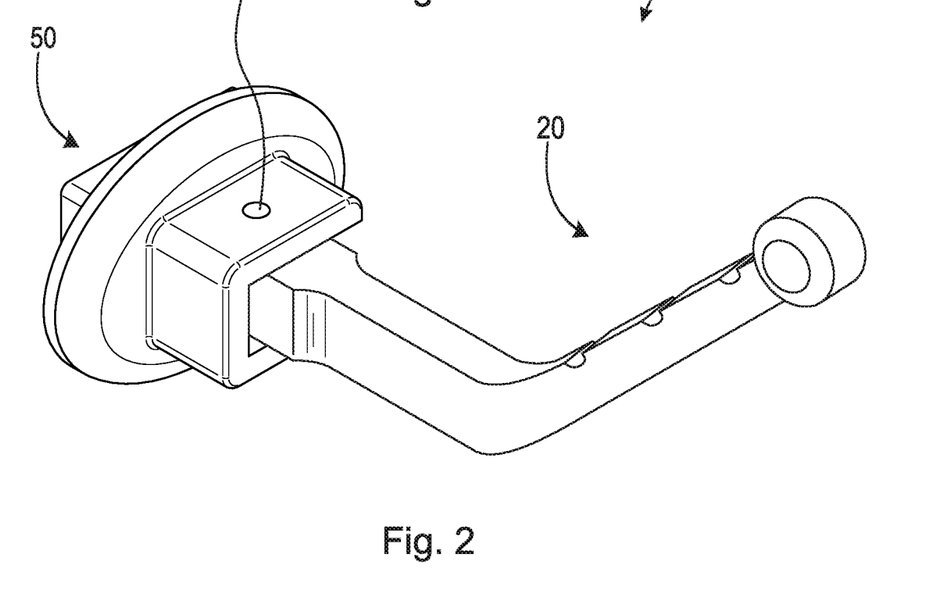
FIG. 2 is a perspective view of the retractable support shown in FIG. 1, in an extended position.
Figure 3:
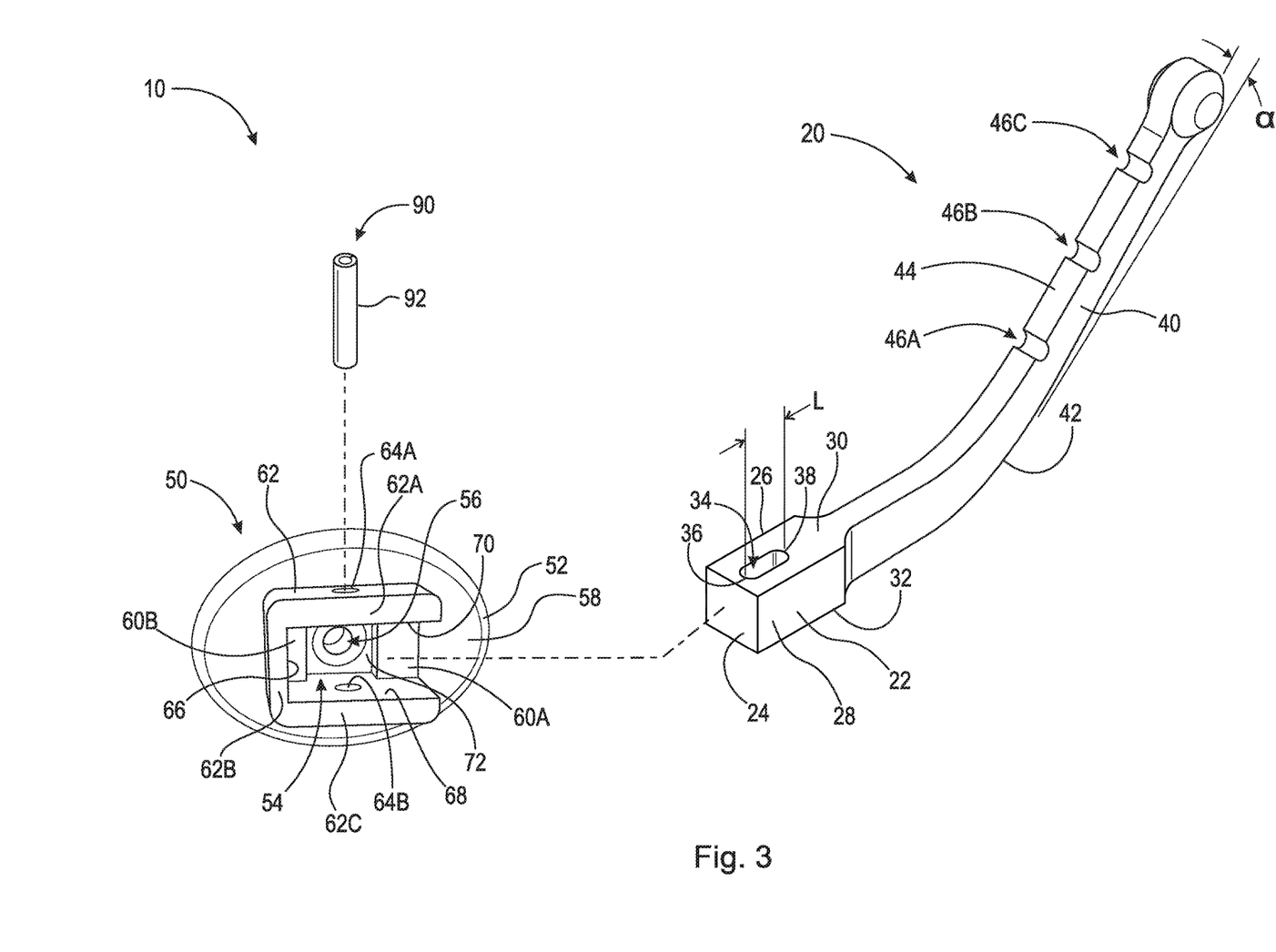
FIG. 3 is an exploded view of the retractable support shown in FIG. 1.
Figure 4A:
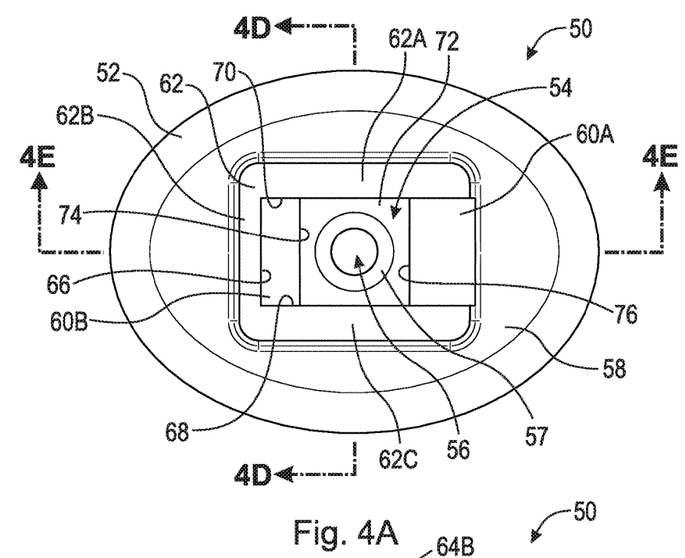
FIG. 4A is a front elevational view of a base as shown in FIG. 1.
Figure 4B:
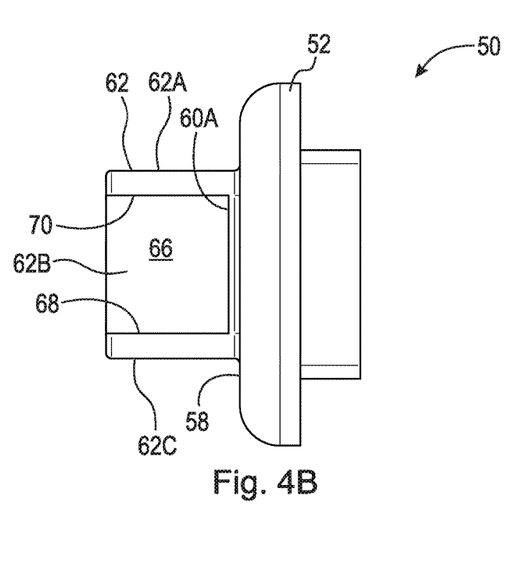
FIG. 4B is a right side elevational view of the base shown in FIG. 4A.
Figure 4C:
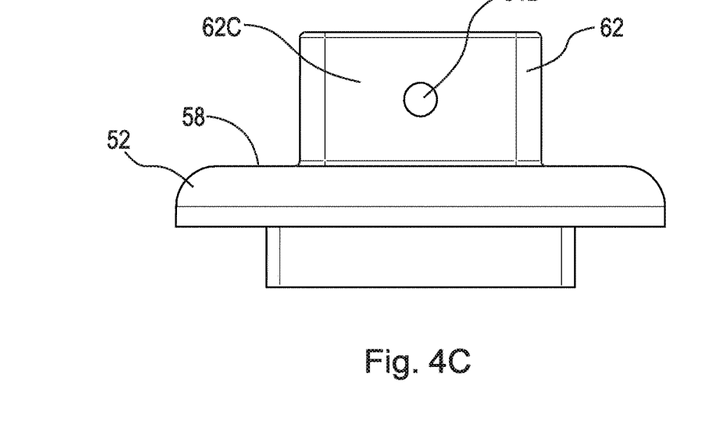
FIG. 4C is a bottom elevational view of the base shown in FIG. 4A.
Figure 4D:
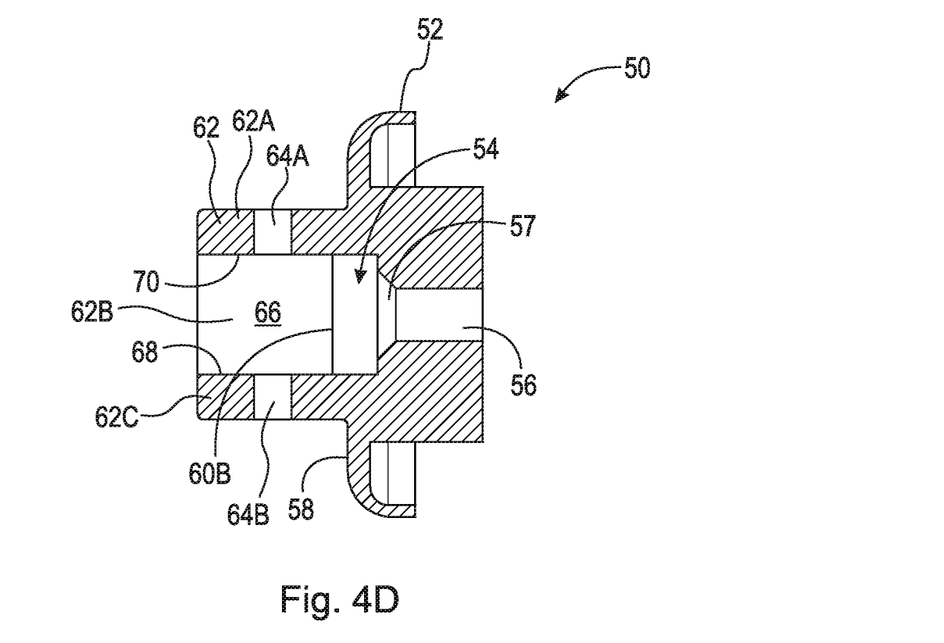
FIG. 4D is a cross-sectional view of the base taken generally along line 4D-4D in FIG. 4A.
Figure 4E:
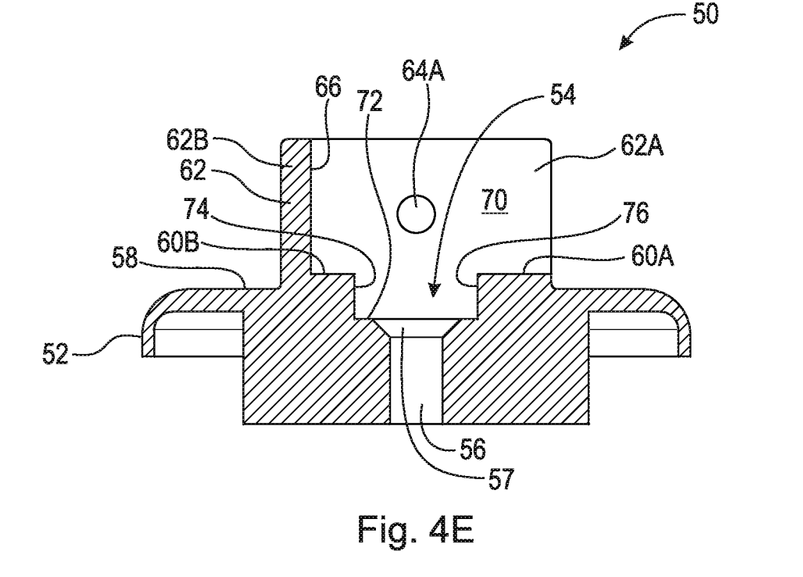
FIG. 4E is a cross-sectional view of the base taken generally along line 4E-4E in FIG. 4A.

Referring now to the figures, FIG. 1 is a perspective view of retractable support 10 in a retracted position. FIG. 2 is a perspective view of retractable support 10 in an extended position. FIG. 3 is an exploded view of retractable support 10. Retractable support 10 generally comprises arm 20, base 50, and pin 90. FIG. 4A is a front elevational view of base 50. FIG. 4B is a right side elevational view of base 50. FIG. 4C is a bottom elevational view of base 50. FIG. 4D is a cross-sectional view of base 50 taken generally along line 4D-4D in FIG. 4A. FIG. 4E is a cross-sectional view of base 50 taken generally along line 4E-4E in FIG. 4A. Retractable support 10, including all of its elements, may comprise polyoxymethylene, for example, Delrin® acetal homopolymer resin, polypropylene, thermoplastic, or other suitable material. In some embodiments, pin 90 may comprise a metallic material. The following description should be read in view of FIGS. 1 through 4E.

Arm 20 comprises section 22 and section 40. Section 22 is generally a rectangular prism and includes surface 24, surface 26, surface 28, surface 30, and surface 32. As shown, surface 26 is arranged opposite surface 28, surface 30 is arranged opposite surface 32, and surface 24 is arranged adjacent to surfaces 26, 28, 30, and 32. Section 22 further comprises hole 34. Hole 34 comprises an ellipsoidal geometry, that is, hole 34 is an ellipse that extends at least partially through section 22. Hole 34 generally comprises end 36 and end 38. The length of hole 34, that is, from end 36 to end 38, is length L. It should be appreciated that hole 34 may comprise an ovular, rectangular, or triangular geometry, or any other geometry suitable to allow pivotal and translational movement of arm 20 relative to base 50, as will be discussed in greater detail below. In the embodiment shown, hole 34 is a through-hole that extends from surface 30 to surface 32. In some embodiments, hole 34 extends only partially through section 22, for example, from surface 30 or surface 32. In some embodiments, section 22 comprises two holes, one extending partially through section 22 from surface 30 and the other extending partially through section 22 from surface 32. Section 40 is connected to and extends from section 22. Section 40 comprises surface 42 and surface 44. As shown in FIGS. 1-7, surface 44 is at least partially co-planar with surface 30 and curvilinear. In some embodiments, surface 44 is generally co-planar with surface 30 (see FIGS. 8 and 9). In some embodiments, surface 42 is tapered and arranged at angle α relative to surface 44. In some embodiments, surface 42 is not tapered and is arranged in parallel with surface 44. In some embodiments, surface 42 and/or surface 44 are curvilinear, as shown in FIGS. 1-7. In some embodiments, surface 42 is linear and coplanar with surface 30 and surface 42 is linear and coplanar with surface 32. In some embodiments, surface 44 is tapered. Surface 44 comprises one or more grooves. In the embodiment shown, surface 44 comprises grooves 46A-C. Grooves 46A-C are arranged to engage clothes hangers. However, it should be appreciated that section 40, specifically surface 44, may comprise any design suitable to hold bags, hangers, clothes, etc. In some embodiments, surface 44 comprises no grooves. Arm 20 may further comprise a knob at a distal end thereof, specifically, connected to the distal end of section 40.

Base 50 comprises section 52, section 60A, section 60B, and section 62. Section 52 includes hole 54, through-bore 56, and surface 58. Section 52 is arranged to be mounted to a surface, for example, the inside wall of a vehicle, via through-bore 56 and a fastener (e.g., screw, bolt, rivet, etc.). In some embodiments, section 52 is arranged to be secured via an adhesive. It should be appreciated that section 52 is shown having an ovular or ellipsoidal geometry; however, any other geometric shape, such as rectangular, square, triangular, circular, etc., may be used. Through-bore 56 is generally arranged in hole 54 and may further comprise countersink 57. Hole 54 extends into section 52 from surface 58. Hole 54 comprises surface 72, surface 74, and surface 76 (see FIGS. 4A-E). Surface 76 is arranged opposite surface 74, and surface 72 is arranged adjacent surfaces 74 and 76. Hole 54 is arranged to engage section 22 of arm 20 in a locking manner, as will be discussed in greater detail below. Section 60A is connected to and extends from section 52. Specifically, section 60A extends from surface 58 and is arranged adjacent to hole 54, namely, surface 76. Section 60B is connected to and extends from section 52. Specifically, section 60B extends from surface 58 and is arranged adjacent to hole 54, namely, surface 74. Sections 60A and 60B provide a translational sliding surface for section 22 of arm 20, specifically surface 26, as will be discussed in greater detail below. Section 62 is connected to and extends from section 52 and at least partially circumscribes hole 54 and/or sections 60A-B. Section 62 includes portions 62A-C. Portion 62A is arranged opposite to portion 62C, and portion 62B is arranged adjacent to portions 62A and 62C. Portion 62A and 62C are arranged adjacent to hole 54. Portion 62B is arranged adjacent section 60B. Portion 62A includes surface 70, portion 62B includes surface 66, and portion 62C includes surface 68. Surfaces 70 and 68 are arranged to abut against and slidingly engage surfaces 30 and 32, respectively. Additionally, portion 62A includes through-hole 64A and portion 62C includes through-hole 64C. In some embodiments, section 62 only comprises on through hole arranged on either portion 62A or portion 62C. In some embodiments, section 62 comprises a partial through-hole in portion 62A and/or portion 62C. Surface 66 is arranged to abut against surface 24 and sections 60A and 60B are arranged to abut against surface 26 when arm 20 is in a locked retracted position. Surfaces 74 and 76 are arranged to abut against surfaces 28 and 26, respectively, and surface 72 is arranged to abut against surface 24 when arm 20 is in a locked expanded position.

Arm 20 is hingedly and translationally connected to base 50 via pin 90. In some embodiments, arm 20 is pivotably and translationally connected to base 50. Pin 90 is generally a cylindrical rod including radially outward facing surface 92. Pin 90 extends through hole 64A, hole 34, and hole 64B. In some embodiments, retractable support 10 may comprise two pins, with one pin extending through hole 64A and partially into section 22 via surface 30, and the other pin extending through hole 64B and partially into section 22 via surface 32. In some embodiments, retractable support comprises one pin that extends through either hole 64A or hole 64B and partially into section 22. It should be appreciated that many embodiments that allow arm 20 to be hingedly and translationally connected to base 50 can be envisioned, and that the present disclosure should not be limited to only those embodiments specifically discussed. It should also be appreciated that pin 90 can be a dowel, rod, screw, bolt, rivet, or any other suitable means for hingedly and translationally connecting arm 20 to base 50.

Figure 5A:
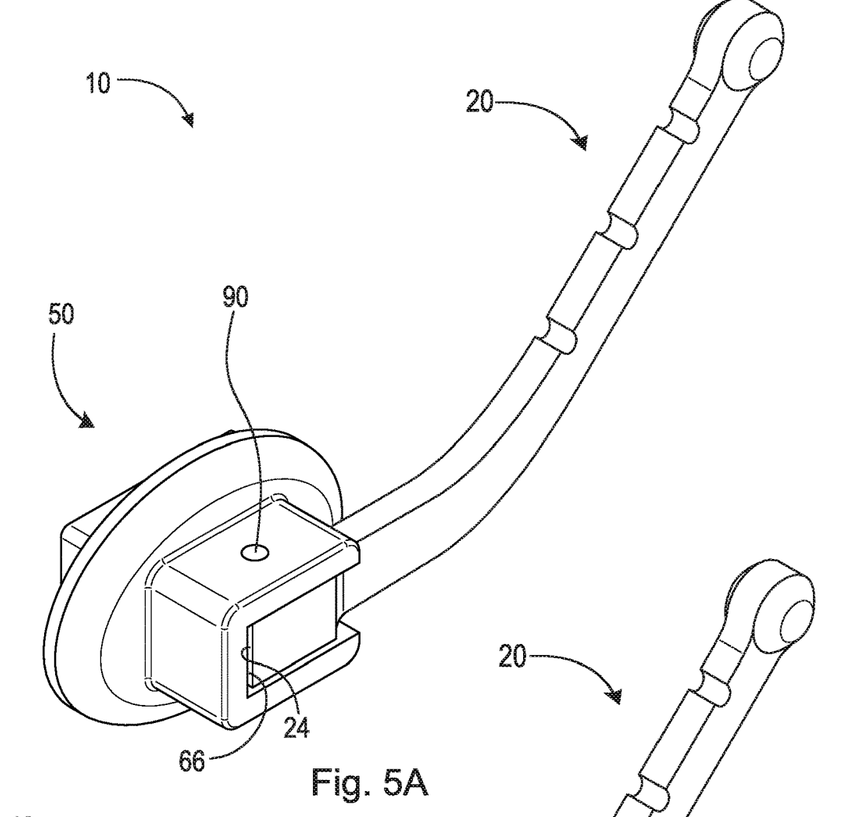
FIG. 5A is a perspective view of the retractable support shown in FIG. 1 in a locked retracted position.

FIG. 5A is a perspective view of retractable support 10 in a locked retracted position. In the locked retracted position shown in FIG. 5A, surface 26 of section 22 substantially abuts against or is arranged in close proximity to sections 60A and 60B, surface 24 of section 22 substantially abuts against or is arranged in close proximity to surface 66, and end 38 of hole 34 substantially abuts against or is arranged in close proximity to radially outward facing surface 92 of pin 90. In the locked retracted position, arm 20 is not capable of hingedly displacing with respect to base 50. However, in the locked retracted position, arm 20 is capable of translationally displacing with respect to base 50.

Figure 5B:
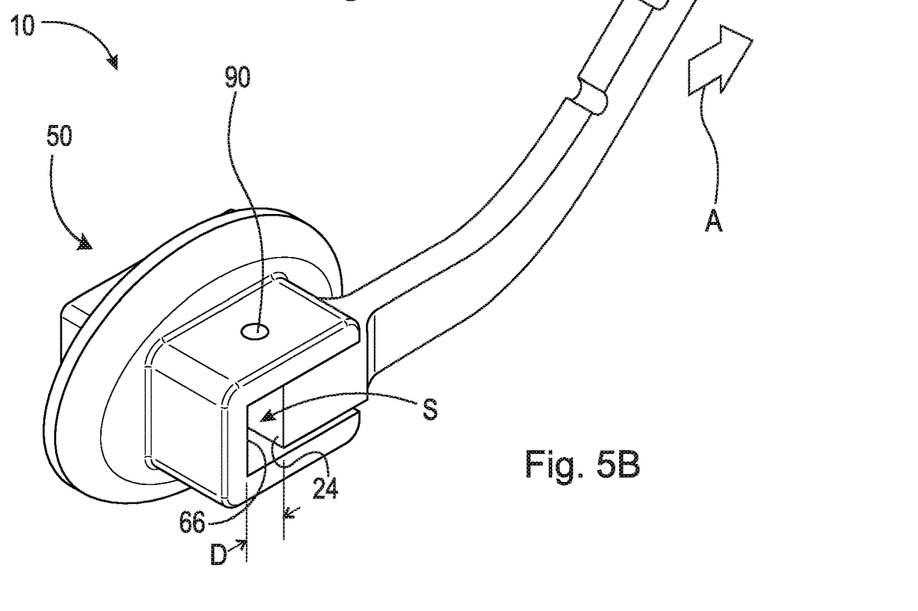
FIG. 5B is a perspective view of the retractable support shown in FIG. 1 in an unlocked retracted position.

FIG. 5B is a perspective view of retractable support 10 in an unlocked retracted position. To move retractable support 10 from the locked retracted position shown in FIG. 5A to the unlocked retracted position shown in FIG. 5B, arm 20 is translationally displaced in direction A. In the unlocked retracted position shown in FIG. 5B, surface 26 of section 22 substantially abuts against or is arranged in close proximity to section 60A and end 36 of hole 34 substantially abuts against or is arranged in close proximity to radially outward facing surface 92 of pin 90. Also, space S is formed between surface 24 of section 22 and surface 66 of section 62. Surface 24 is separated from surface 66 by distance D, which is substantially equal to length L of hole 34. In the unlocked retracted position, as shown in FIG. 5B, arm 20 is capable of hingedly and translationally displacing with respect to base 50.

Figure 5C:
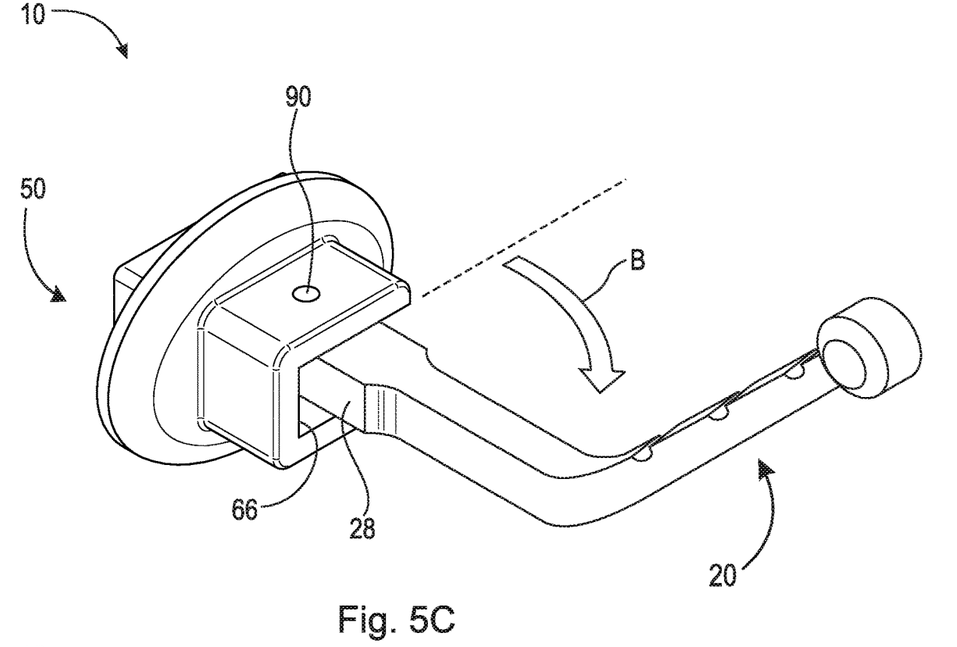
FIG. 5C is a perspective view of the retractable support shown in FIG. 1 in an unlocked expanded position.

FIG. 5C is a perspective view of retractable support 10 in an unlocked expanded position. To move retractable support 10 from the unlocked retracted position shown in FIG. 5B to the unlocked expanded position shown in FIG. 5C, arm 20 is rotationally displaced in direction B. In the unlocked expanded position shown in FIG. 5C, surface 28 of section 22 is substantially aligned with surface 74 of hole 54, surface 26 of section 22 is substantially aligned with surface 76 of hole 54, and end 36 of hole 34 substantially abuts against or is arranged in close proximity to radially outward facing surface 92 of pin 90. In the unlocked expanded position, as shown in FIG. 5C, arm 20 is capable of hingedly and translationally displacing with respect to base 50.

Figure 5D:
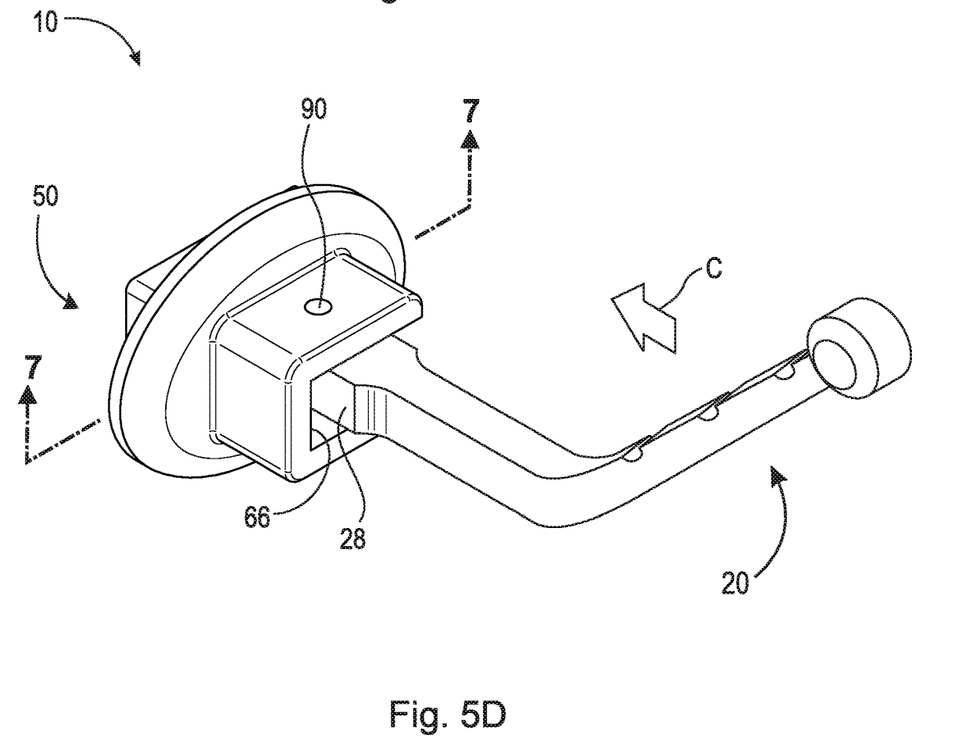
FIG. 5D is a perspective view of the retractable support shown in FIG. 1 in a locked expanded position.

FIG. 5D is a perspective view of retractable support 10 in a locked expanded position. To move retractable support 10 from the unlocked expanded position shown in FIG. 5C to the locked expanded position shown in FIG. 5D, arm 20 is translationally displaced in direction C. In the locked expanded position shown in FIG. 5D, surface 24 of section 22 substantially abuts against or is arranged in close proximity to surface 72 of hole 54, surface 26 of section 22 substantially abuts against or is arranged in close proximity to surface 76 of hole 54, surface 28 of section 22 substantially abuts against or is arranged in close proximity to surface 74 of hole 54, and end 38 of hole 34 substantially abuts against or is arranged in close proximity to radially outward facing surface 92 of pin 90. In the locked expanded position, arm 20 is not capable of hingedly displacing with respect to base 50. However, in the locked expanded position, arm 20 is capable of translationally displacing with respect to base 50.

Figure 6:
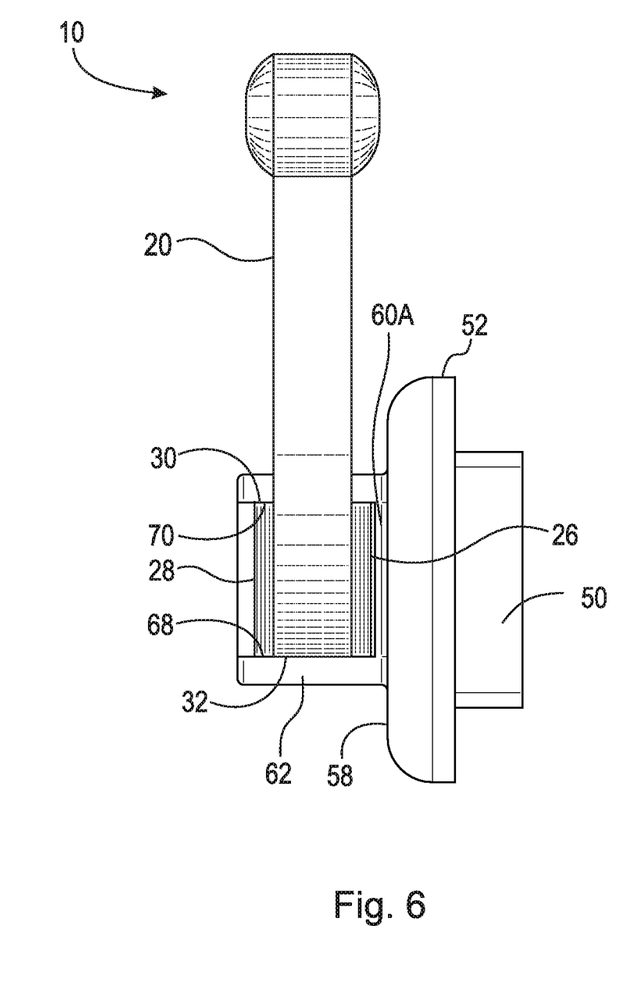
FIG. 6 is a side elevational view of the retractable support shown in FIG. 5A.

FIG. 6 is a side elevational view of retractable support 10 in the locked retracted position as shown in FIG. 5A. As can be seen, surface 26 substantially abuts against or is arranged in close proximity to section 60A and section 60B (not shown). Additionally, surface 30 substantially abuts against or is arranged in close proximity to surface 70 and surface 32 substantially abuts against or is arranged in close proximity to surface 68.

Figure 7:
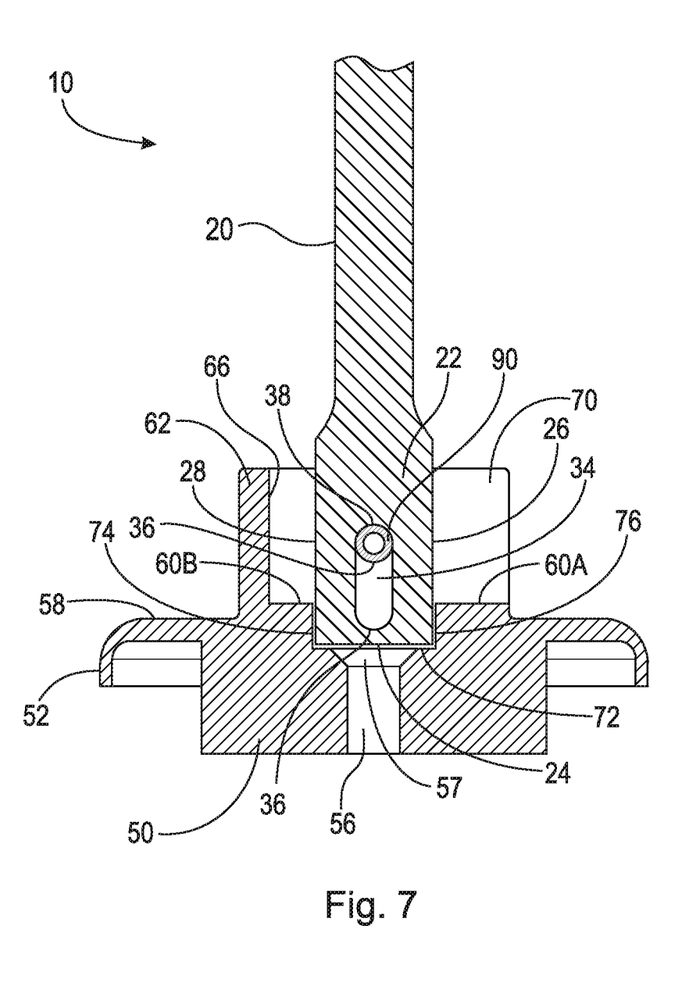
FIG. 7 is a cross-sectional view of the retractable support taken generally along line 7-7 in FIG. 5D.

FIG. 7 is a cross-sectional view of retractable support 10 in the locked expanded position, taken generally along line 7-7 in FIG. 5D. As can be seen, surface 24 of section 22 substantially abuts or is arranged in close proximity to surface 72 of hole 54, surface 26 of section 22 substantially abuts against or is arranged in close proximity to surface 76 of hole 54, surface 28 of section 22 substantially abuts against or is arranged in close proximity to surface 74 of hole 54, and end 38 of hole 34 substantially abuts against or is arranged in close proximity to radially outward facing surface 92 of pin 90. This arrangement of abutting surfaces prevents the rotational displacement of arm 20 with respect to base 50.

Figure 8:
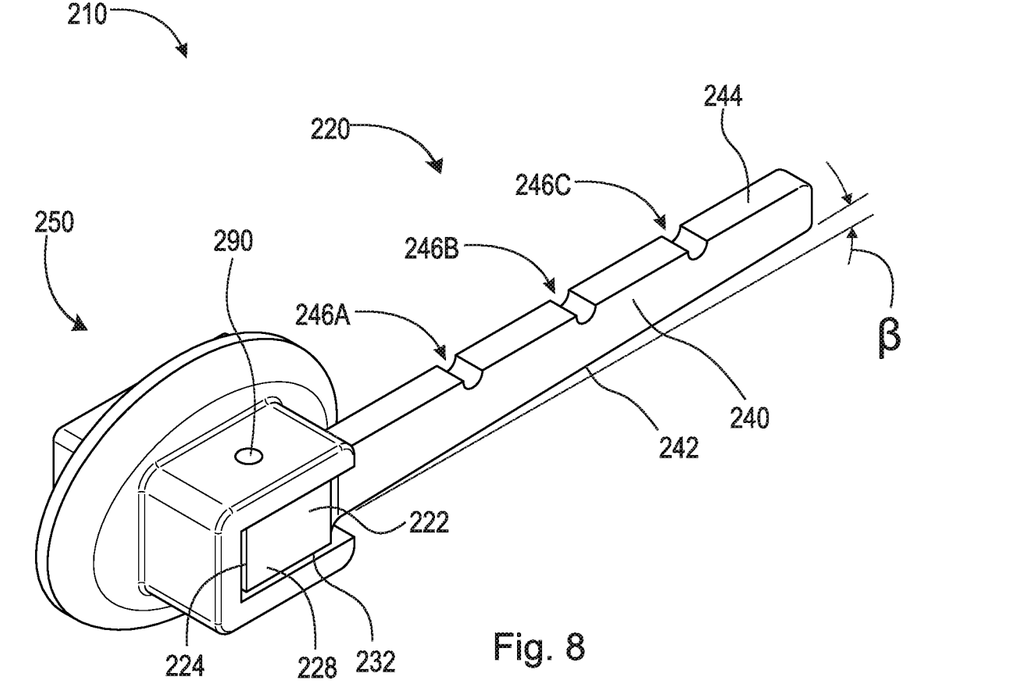
FIG. 8 is a perspective view of a retractable support in a retracted position.
Figure 9:
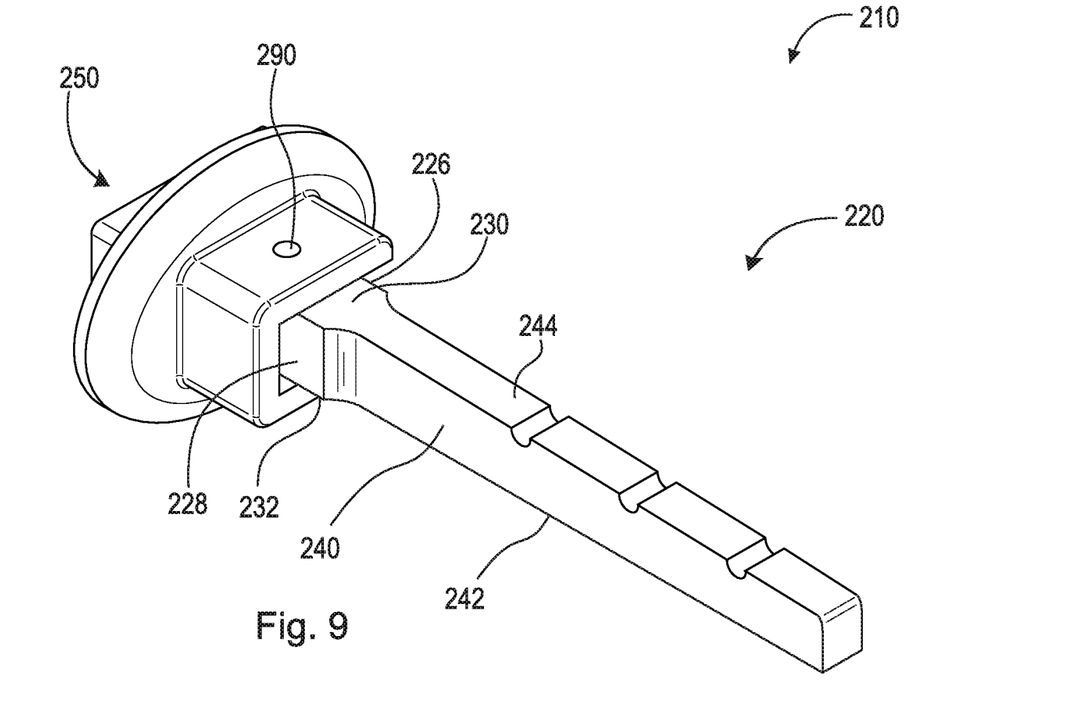
FIG. 9 is a perspective view of the retractable support shown in FIG. 8, in an extended position.

FIG. 8 is a perspective view of retractable support 210 in a retracted position. FIG. 9 is a perspective view of retractable support 210 in an extended position. Retractable support 210 generally comprises arm 220, base 250, and pin 290. Base 250 is substantially the same as base 50. Pin 290 is substantially the same as pin 90. Retractable support 210, including all of its elements, may comprise polyoxymethylene, for example, Delrin® acetal homopolymer resin, polypropylene, thermoplastic, or other suitable material. In some embodiments, pin 290 may comprise a metallic material. The following description should be read in view of FIGS. 8 and 9.

Retractable support 210 is substantially similar to retractable support 10, aside from arm 220. Arm 220 comprises section 222 and section 240. Section 222 is generally a rectangular prism and includes surface 224, surface 226, surface 228, surface 230, and surface 232. As shown, surface 226 is arranged opposite surface 228, surface 230 is arranged opposite surface 232, and surface 224 is arranged adjacent to surfaces 226, 228, 230, and 232. Section 222 further comprises hole 234 (not shown), substantially similar to that of hole 34 of section 22 of retractable support 10. Hole 234 comprises an ellipsoidal geometry, that is, hole 234 is an ellipse that extends at least partially through section 222. Hole 234 generally comprises end 236 and end 238. The length of hole 234, that is, from end 236 to end 238, is length L. It should be appreciated that hole 234 may comprise an ovular, rectangular, or triangular geometry, or any other geometry suitable to allow pivotal and translational movement of arm 220 relative to base 250. In the embodiment shown, hole 234 is a through-hole that extends from surface 230 to surface 232. In some embodiments, hole 234 extends only partially through section 222, for example, from surface 230 or surface 232. In some embodiments, section 222 comprises two holes, one extending partially through section 222 from surface 230 and the other extending partially through section 222 from surface 232. Section 240 is connected to and extends from section 222. Section 240 comprises surface 242 and surface 244. As shown in FIGS. 8 and 9, surface 244 is generally linear and is arranged coplanar with surface 230. In some embodiments, surface 244 is at least partially co-planar with surface 230 and curvilinear. Surface 242 is generally linear and is tapered at angle β relative to surface 232. In some embodiments, surface 242 is not tapered and is coplanar with surface 232. In some embodiments, surface 242 and/or surface 244 are curvilinear. In some embodiments, surface 244 is tapered. Surface 244 comprises one or more grooves. In the embodiment shown, surface 244 comprises grooves 246A-C. Grooves 246A-C are arranged to engage clothes hangers. However, it should be appreciated that section 240, specifically surface 244, may comprise any design suitable to hold bags, hangers, clothes, etc. In some embodiments, surface 244 comprises no grooves. Arm 220 may further comprise a knob at a distal end thereof, specifically, connected to the distal end of section 240.

Figure 10:
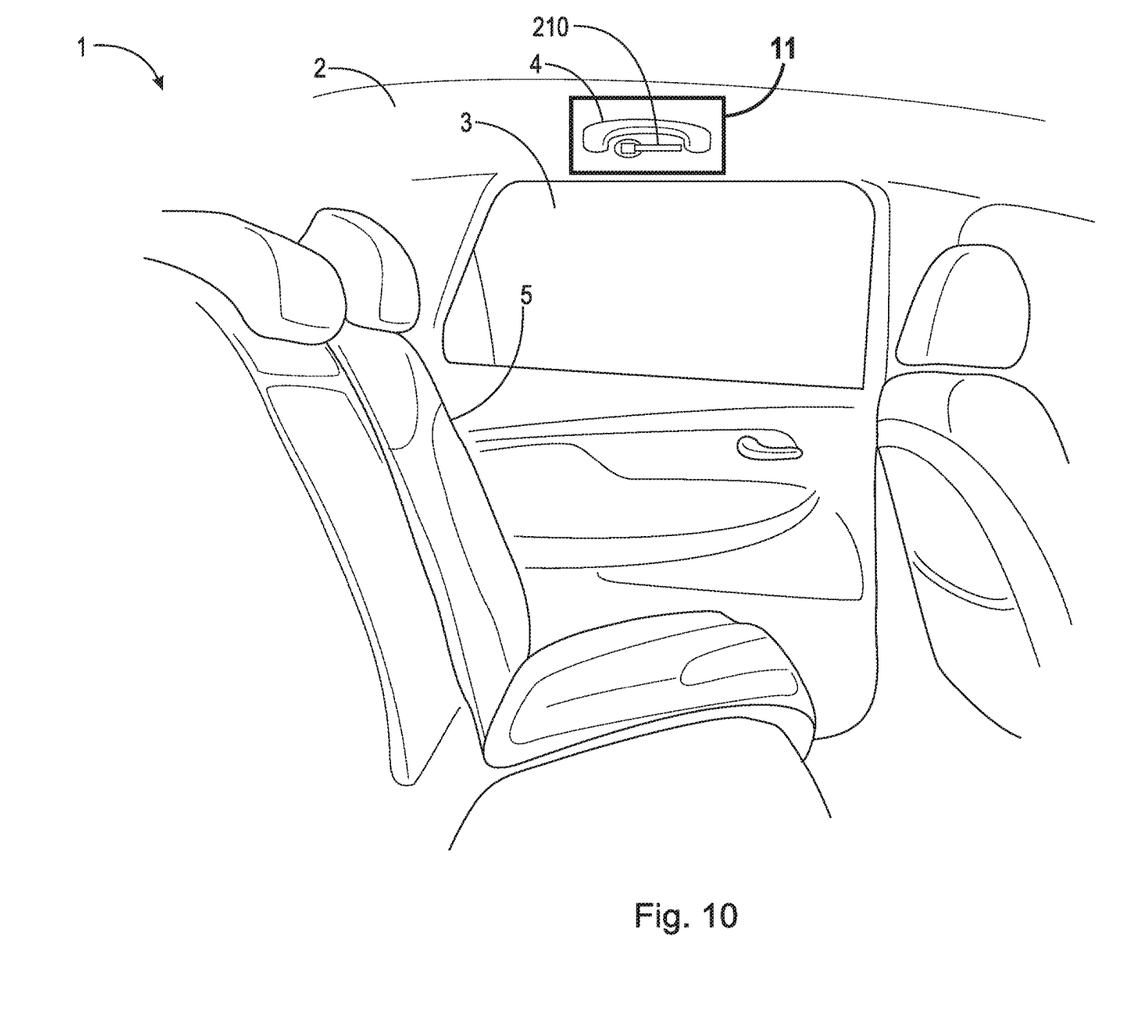
FIG. 10 is an elevational view of the retractable support shown in FIG. 8 installed in a vehicle.
Figure 11:
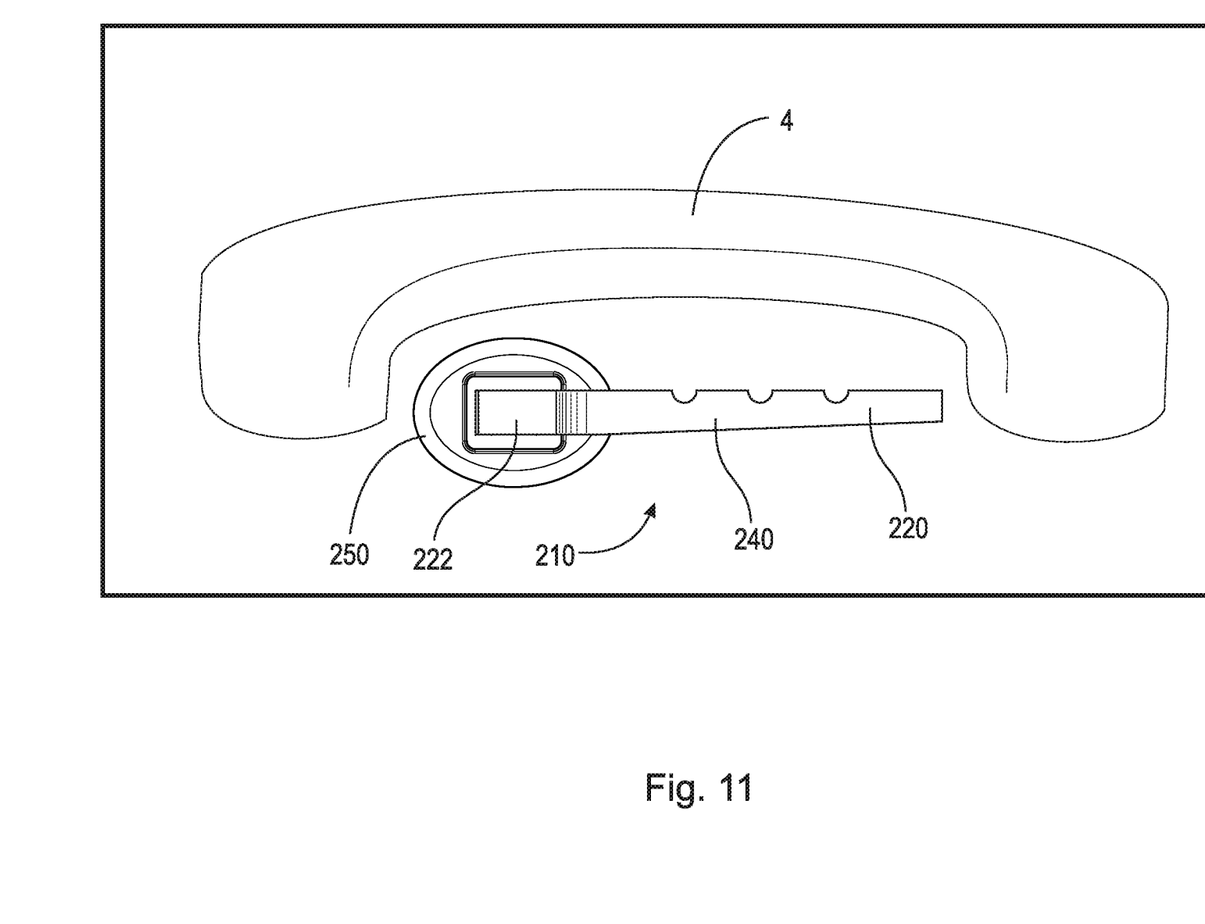
FIG. 11 is an enlarged view taken generally about detail 11 in FIG. 10.

FIG. 10 is an elevational view of retractable support 210 installed in a vehicle 1. FIG. 11 is an enlarged view of retractable support 210 taken generally about detail 11 in FIG. 10. Vehicle 1 generally comprises wall 2, window 3, handle 4 arranged over window 3, and chair 5. Generally, a clothes hook comes standard with vehicles and is arranged over window 3 and either partially circumscribed by handle 4, adjacent to handle 4, or simply above window 3 in cases where no handle exists. The standard clothes hook may be removed simply with a screw driver or other suitable tool and retractable support 210 can be installed in its stead. It should be appreciated that retractable support 10 may similarly be installed. Retractable support 210 allows for easier hanging of clothes and other items thereon due to the length of arm 220, which is shown having a substantially linear section 240. It should be appreciated that retractable support 210 may be used in any environment, including homes, closets, boats, bathrooms, etc., and that the present disclosure should not be limited to use only in vehicles.

Figure 12:
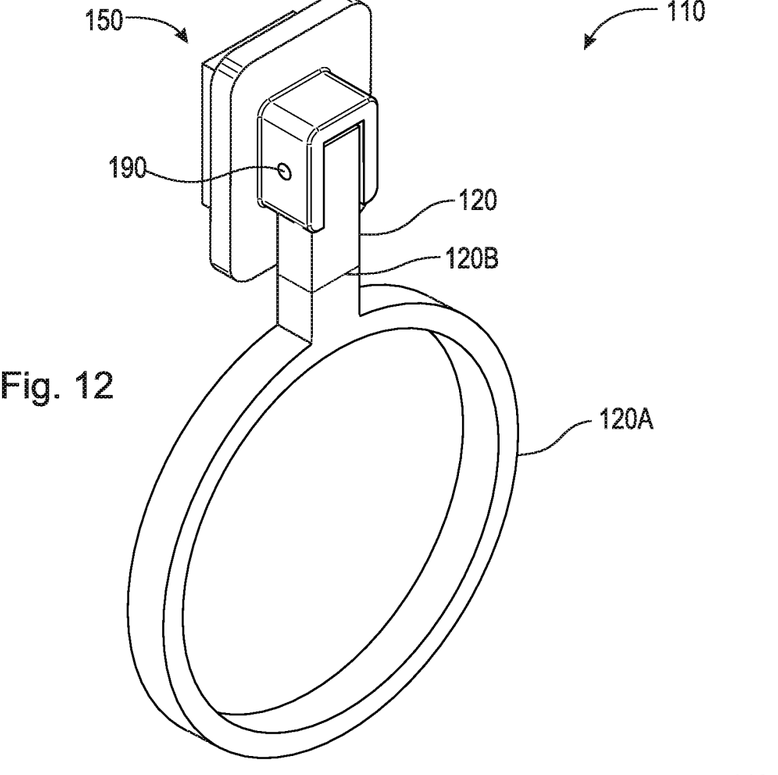
FIG. 12 is a perspective view of a retractable support in a retracted position; and, FIG. 13 is a perspective view of the retractable support shown in FIG. 12 in an expanded position.
Figure 13:
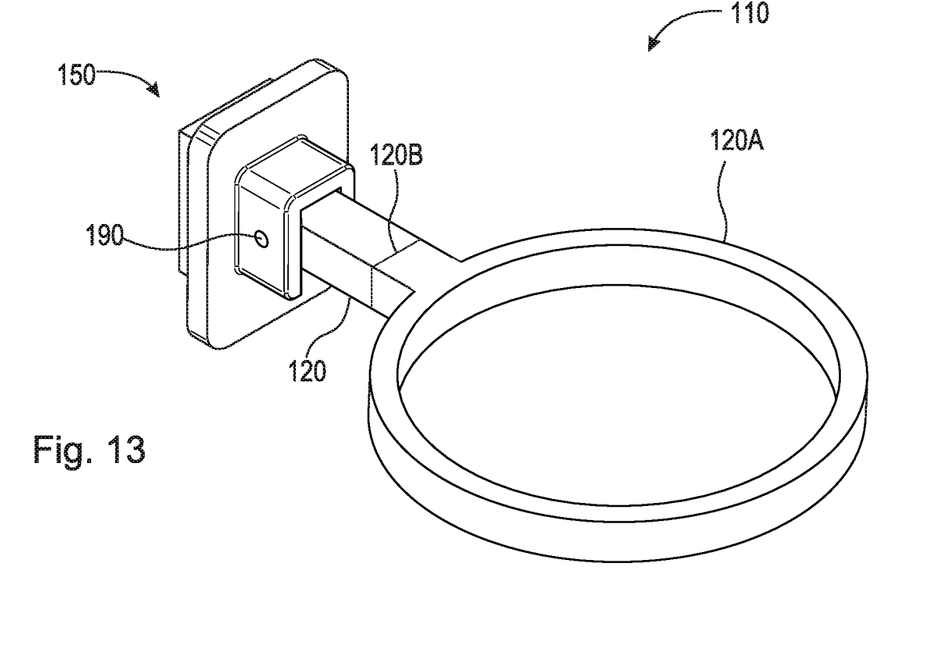

FIG. 12 is a perspective view of retractable support 110 in a retracted position. FIG. 13 is a perspective view of retractable support 110 in an expanded position. Retractable support 110 is substantially the same as retractable support 10 previously described, but comprises a cup holder. Retractable support 110 generally comprises arm 120 having cup holder 120A, base 150, and pin 190. In some embodiments, cup holder 120A is connected to arm 120 via joint 120B such that cup holder 120A may be rotatably connected to arm 120 via joint 120B. Arm 120 is hingedly (or rotatably) and translationally connected to base 150 via pin 190. It should be appreciated that the arm of retractable support may be equipped with any suitable attachment needed.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Vehicle
2 Wall
3 Window
4 Handle
5 Chair
10 Retractable Support
20 Arm
22 Section
24 Surface
26 Surface
28 Surface
30 Surface
32 Surface
34 Hole
36 End
38 End
40 Section
42 Surface
44 Surface
46A Groove
46B Groove
46C Groove
50 Base
52 Section
54 Hole
56 Through-bore
57 Countersink
58 Surface
60A Section
60B Section
62 Section
62A Portion
62B Portion
62C Portion
64A Hole
64B Hole
66 Surface
68 Surface
70 Surface
72 Surface
74 Surface
76 Surface
90 Pin
92 Radially outward facing surface
110 Retractable support
120 Arm
120A Cup holder
150 Base
190 Pin
210 Retractable Support
220 Arm
222 Section
224 Surface
226 Surface
228 Surface
230 Surface
232 Surface
234 Hole (not shown)
236 End (not shown)
238 End (not shown)
240 Section 242 Surface
244 Surface
246A Groove
246B Groove
246C Groove
250 Base
290 Pin
α Angle
β Angle
S Space
L Length
D Distance
S Space
A Direction
B Direction
C Direction

What is claimed is:

1. A retractable support, comprising:
a base, including:
a first section including a first surface; and,
a second section connected to the first section; and,
an arm rotatably and translationally connected to the base, the arm including:
a third section engaged with the second section, the third section including a second surface, a third surface, and a fourth surface; and,
a fourth section connected to the third section;
wherein, the arm is arranged to:
translationally displace relative to the base to lock and unlock the retractable support; and,
rotationally displace relative to the base to expand and retract the support.

2. The retractable support as recited in claim 1, wherein the third section comprises a first hole.

3. The retractable support as recited in claim 2, wherein the first hole is ellipsoidal.

4. The retractable support as recited in claim 3, wherein a pin extends into the first hole and connects the third section with the second section.

5. The retractable support as recited in claim 3, wherein the first section further comprises a second hole extending from the first surface, the second hole including a fifth surface, a sixth, surface, and a seventh surface.

6. The retractable support as recited in claim 5, wherein in a locked expanded position:
the fifth surface is arranged in substantial proximity to the second surface;
the sixth surface is arranged in substantial proximity to the third surface; and,
the seventh surface is arranged in substantial proximity to the fourth surface.

7. The retractable support as recited in claim 5, wherein the second section further comprises:
a first portion arranged proximate the second hole;
a second portion arranged proximate the second hole and adjacent to the first portion; and,
a third portion arranged proximate the second hole, opposite the first portion, and adjacent to the second portion.

8. The retractable support as recited in claim 7, wherein in a locked retracted position;
the second surface is arranged in substantial proximity to the first surface; and,
the third surface is arranged in substantial proximity to the second portion.

9. The retractable support as recited in claim 7, wherein a pin extends into the first hole and connects to at least one of the first portion and the third portion.

10. The retractable support as recited in claim 9, wherein:
the first hole comprises a first end and a second end;
in an unlocked position, the first end is arranged in substantial proximity to the pin; and,
in a locked position, the second end is arranged in substantial proximity to the pin.

11. A retractable support, comprising:
a base, including:
a first section including a first surface; and,
a second section connected to the first section; and,
an arm connected to the base, the arm including:
a third section engaged with the second section, the third section including a second surface, a third surface, and a fourth surface; and,
a fourth section connected to the third section;
wherein:
in a locked position, the arm is translationally displaceable and rotatably locked with respect to the base; and,
in an unlocked position, the arm is translationally and rotationally displaceable with respect to the base.

12. The retractable support as recited in claim 11, wherein the third section comprises a first hole.

13. The retractable support as recited in claim 12, wherein the first hole is ellipsoidal.

14. The retractable support as recited in claim 13, wherein a pin engages the first hole and the second section to connect the arm with the base.

15. The retractable support as recited in claim 14, wherein the first section further comprises a second hole extending from the first surface, the second hole including a fifth surface, a sixth surface, and a seventh surface.

16. The retractable support as recited in claim 15, wherein in a locked expanded position:
the fifth surface is arranged in substantial proximity to the second surface;
the sixth surface is arranged in substantial proximity to the third surface; and,
the seventh surface is arranged in substantial proximity to the fourth surface.

17. The retractable support as recited in claim 15, wherein the second section further comprises:
a first portion arranged proximate the second hole;
a second portion arranged proximate the second hole and adjacent to the first portion; and,
a third portion arranged proximate the second hole, opposite the first portion, and adjacent to the second portion.

18. The retractable support as recited in claim 17, wherein in a locked retracted position;
the second surface is arranged in substantial proximity to the first surface; and,
the third surface is arranged in substantial proximity to the second portion.

19. The retractable support as recited in claim 18, wherein:
the first hole comprises a first end and a second end;
in the unlocked position, the first end is arranged in substantial proximity to the pin; and,
in the locked position, the second end is arranged in substantial proximity to the pin.

20. A retractable support, comprising:
a base, including:
a first section including a first surface and a first hole; and,
a second section connected to the first section, the second section including:
a first portion arranged proximate the first hole;

a second portion arranged proximate the first hole and adjacent to the first portion; and,
a third portion arranged proximate the first hole, opposite the first portion, and adjacent to the second portion;
an arm connected to the base, the arm including:
a third section engaged with the second section, the third section including:
a second hole;
a second surface;
a third surface arranged adjacent the second surface; and,
a fourth surface arranged opposite the second surface and adjacent the third surface; and,
a fourth section connected to the third section; and,
a pin connected to the second section and engaged with the second hole;
wherein:
in a locked retracted position, the second surface substantially abuts against the first surface and the third surface substantially abuts against the second portion; and,
in a locked expanded position, the fifth surface substantially abuts the second surface, the sixth surface substantially abuts the third surface, and the seventh surface substantially abuts the fourth surface.

* * * * *